UNITED STATES PATENT OFFICE.

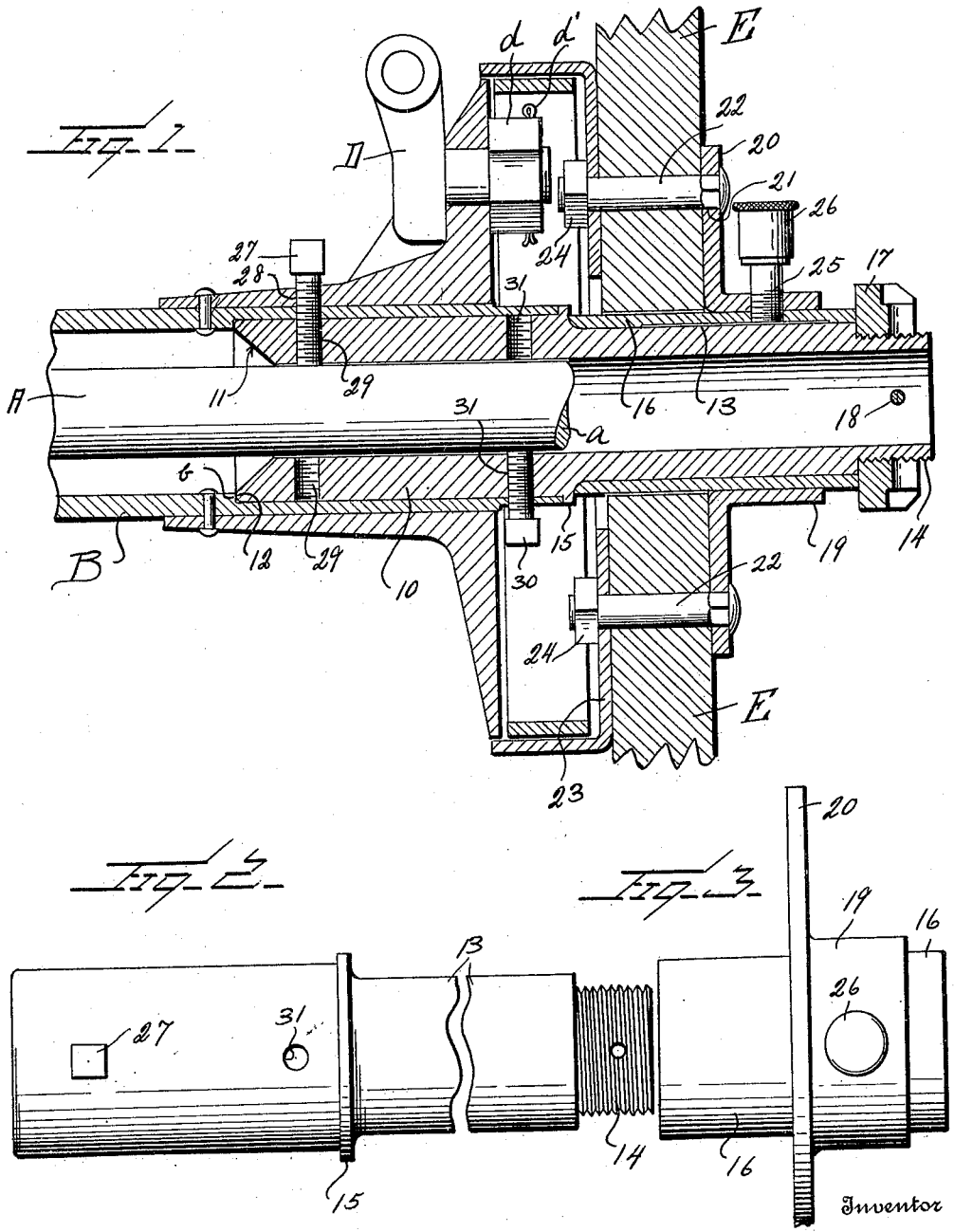

GEORGE E. LUTSEY, OF WILKES-BARRE, PENNSYLVANIA.

EMERGENCY REAR WHEEL AXLE AND HUB.

1,395,921.  Specification of Letters Patent.  Patented Nov. 1, 1921.

Application filed June 22, 1921. Serial No. 479,629.

*To all whom it may concern:*

Be it known that I, GEORGE E. LUTSEY, a citizen of the United States, residing at Wilkes-Barre, in the county of Luzerne and State of Pennsylvania, have invented certain new and useful Improvements in Emergency Rear-Wheel Axles and Hubs, of which the following is a specification, reference being had to the accompanying drawings.

This invention relates to automobiles, and particularly to an emergency rear wheel axle and hub designed to be used in case the rear axle breaks, the invention being particularly adapted for a Ford type of car but not being limited thereto, as it is applicable to various other makes of cars.

The general object of the invention is the provision of an attachment which can be applied to the broken rear axle of a car and support the wheel thereof so that the car may be driven under its own power without the necessity of the car being towed, the attachment not being designed as a permanent appliance but simply as a means whereby the car may be taken under its own power to a garage or other place where a new rear axle may be substituted for the broken axle.

A further object is to provide a construction of this character which will hold the broken axle from rotation and which will therefore cause the differential to transmit all power to the opposite rear wheel so that no driving strain is placed upon the broken section of the axle or upon the wheel mounted thereon by my appliance.

Another object is to provide a construction of this character so designed that the emergency brake drum usually found on cars of this type may be used, which is particularly necessary in view of the fact that with a broken rear axle the regular brake of certain types of cars, such as the Ford car, is practically useless and reliance must, therefore, be placed upon the emergency brake.

Still another object is to provide a construction of this character which merely requires the removal of the wheel, the wheel hub and broken end of the axle, the attachment being so designed that it may be then put in position and take the place of the ordinary hub of the wheel, the wheel and brake drum being put back upon the attachment and the wheel being disposed in exactly the same position that it was prior to the break.

A still further object is to so construct the attachment that it may be readily inserted in place within the housing and surrounding the body of the broken axle and that the attachment may be connected to the broken axle and to the housing by set screws passing through openings which are present in the usual housing.

Other objects will appear in the course of the following description.

My invention is illustrated in the accompanying drawings, wherein:—

Figure 1 is a diametrical sectional view of the rear axle housing of an automobile, showing my emergency hub and rear axle sleeve applied thereto;

Fig. 2 is a plan view of the emergency sleeve and the hub;

Fig. 3 is a plan view of the bushing and the hub flange thereof.

Referring to these drawings, A designates the axle of a Ford car and B the regular axle housing thereof. My attachment comprises an auxiliary axle tube, designated 10, which is of steel and relatively thick, the inner end of this tube being beveled, as at 11, and formed with a slight rounded shoulder 12 at the extremity of the tube. The outer half of this tube is reduced in diameter, as at 13, and the extremity of the tube is still further reduced in exterior diameter and exteriorly screw-threaded, as at 14. About midway of its length the auxiliary axle tube 10 is formed with a shoulder 15 which defines the inner end of the reduced portion 13, the junction between this shoulder 15 and the surface of the reduced portion being rounded. Disposed upon this reduced portion 13 and bearing against the rounded face of this shoulder 15 is a bronze bushing 16 which is adapted to be held in place against the shoulder 15 by means of the castellated nut 17. This nut, as before remarked, is a castellated nut, and through the nut and through the extremity of the auxiliary tube or sleeve 10 passes a cotter pin 18 holding the nut in place. Any other suitable means for holding this nut in place may be used, however.

Welded to the bushing 16 is an annulus 19 which is angular in cross section to provide a flange resting against the bushing and a flange 20 extending at right angles thereto. This flange 20 adjacent its periphery is formed with a plurality of square openings 21 for the passage of bolts 22 having square portions adjacent their heads which fit the rectangular or square openings 21. The screw-threaded extremities of the bolts are adapted to pass through the web of a brake drum 23 which may be and preferably will be the regular emergency brake drum such as used on the Ford automobile. Bearing against the inner face of the web of the brake drum are the nuts 24 which engage the bolts 22.

Preferably passing through the annulus 19 is the stem 25 of a grease cup 26 whereby the bushing 16 is lubricated, this grease cup discharging lubricant between the bushing and the auxiliary axle tube or sleeve.

In the use of this device, assuming that the axle A has been broken at the point $a$, which is the point at which about 85% of the axles break, the wheel is taken off the car, together with the broken portion of the axle, and then the sleeve or auxiliary tube 10 is inserted over the stub of the axle A. This insertion is made easy by the beveled face 11 of this auxiliary axle tube, and the rounded shoulder 12 permits of the ready insertion of this auxiliary axle tube in the end of the housing B. Furthermore, this rounded edge 12 and the beveled face 11, as the auxiliary axle tube is inserted within the housing, act to lift up on the end of the broken axle and guide the end of the broken axle into the auxiliary tube. The auxiliary tube is inserted into the housing until it strikes the shoulder $b$ on the housing. A set screw 27 is then inserted through an aperture 28 in the housing B, which aperture is screw-threaded and constitutes the aperture through which the stem of the regular lubricating cup ordinarily passes. This set screw 27 passes through the housing B and through an aperture 29 in the auxiliary tube and engages the broken axle so that the auxiliary tube or sleeve 10 is held rigidly to the housing and to the broken axle. Preferably a second set screw 30 is used which passes through the housing within the brake drum and extends through the auxiliary axle tube and also engages the axle A.

Here, again, in Ford automobiles or automobiles of like type, there is a screw-threaded aperture leading from the interior of the brake drum through the regular axle housing, and I make use of this aperture for the purpose of inserting the set screw 30. Preferably there will be a plurality of apertures 29 and of apertures 31 for the set screws 30, the apertures 29 being disposed around the auxiliary tube in a slightly staggered or off-set relation to each other and differing in distance from the extremity of the auxiliary tube by about $\frac{1}{16}''$ so that one of these apertures is bound to register with the aperture 28 in the axle housing and one of these apertures 31 is bound to register with the aperture in the axle housing extending inward from the brake drum. Thus by rotating the sleeve or auxiliary tube 10 until one of the apertures registers with the openings 29 and 31, it is an easy matter to insert the set screws and hold the attachment in place upon the axle housing and axle. Of course, it will be understood that attached to the housing B is the regular housing head C which forms the inner wall of the brake drum, and that attached to this head C is the usual spring perch D held in place by the nut $d$ and cotter pin $d'$.

After the insertion of the auxiliary axle tube 10 and the insertion of the set screws 27 and 30, the spokes E of the wheel are put in place upon the bushing 16 and the bolts 22 inserted and then the bushing which now constitutes the hub of the wheel with the brake drum and allied parts is slipped in place upon the auxiliary axle tube, and then the nut 17 is put in place, holding the bushing from outward movement. After the parts have been put in place and the nut 17 locked, the car can proceed under its own power to a place where repairs may be made, the axle section A being held by the set screws 27 and 31 and thus causing the differential to transmit all power to the opposite rear wheel. It will be seen that provision is made for lubricating the emergency hub so as to permit the free rotation of the wheel upon the substitute axle or sleeve 10 and that the brake drum functions in precisely the same manner as the usual emergency brake drum so that the car is under control.

It will be seen that my attachment does not in any way require any change in the construction of the housing, axle or allied parts of the automobile, and that in order to apply my attachment it is merely necessary to remove the old wheel and the broken portion of the axle and put my attachment in place and put the wheel thereon. The parts of the attachment are relatively light, take up but a slight amount of room and are relatively inexpensive to manufacture.

Inasmuch as the auxiliary axle tube 10 has a close fit between the axle stub A and the housing, a very firm support is given to the axle of the housing and the auxiliary tube 10 and an ample bearing surface is provided. Furthermore, it will be noted that the device may be used whether the axle breaks considerably nearer its extremity than is illustrated or considerably nearer the shoulder $b$ of the axle housing than is illustrated so that the device may be used under many different circumstances of breaking axle and is not dependent for its availability upon the axle breaking at one point or very close thereto.

I claim:—

1. An emergency repair attachment for automobile axles comprising a tubular auxiliary axle adapted to fit the broken axle and fit within the axle housing and being formed intermediate its ends with an outwardly projecting shoulder adapted to bear against the extremity of the axle housing, that portion of the auxiliary axle forward of the shoulder being reduced in diameter and the extremity of the tubular axle having a reduced screw-threaded portion, a bushing surrounding the reduced portion of the tubular axle and being rotatable thereon and having a hub flange disposed adjacent the forward end of the bushing, a nut engaging the screw-threads on the terminal end of the auxiliary axle and holding the bushing in place, bolts passing through the hub flange and adapted to engage the spokes of a wheel and the brake drum thereof, said tubular axle having screw-threaded perforations between the shoulder and the inner end of the tubular axle through which set screws may be passed to hold the auxiliary axle in engagement with the housing and the broken axle.

2. A repair attachment for broken automobile axles comprising a tubular auxiliary axle adapted to be disposed between the axle housing and the broken axle and having its inner end reëntrantly beveled, the auxiliary axle being formed intermediate its length with an outwardly projecting flange adapted to abut against the axle housing and outward of this flange being reduced in diameter, a bushing disposed upon said reduced portion and rotating thereon, removable means on the extremity of the axle whereby the bushing may be held in place, a hub flange attached to the bushing and perforated adjacent its periphery, a brake drum, bolts extending through the hub flange and the brake drum and adapted to be disposed through the spokes of the wheel, lubricating means carried by said bushing, and a set screw adapted to extend through the axle housing and through the auxiliary axle into engagement with the broken axle.

In testimony whereof I hereunto affix my signature.

GEORGE E. LUTSEY.